United States Patent

Nakajima

[11] Patent Number: 5,608,388
[45] Date of Patent: Mar. 4, 1997

[54] DATA TRANSFER SYSTEM USING MEMORY WITH FIFO STRUCTURE

[75] Inventor: Shigeru Nakajima, Kawasaki, Japan

[73] Assignee: Kabushiki Kaisha Toshiba, Kawasaki, Japan

[21] Appl. No.: 543,769

[22] Filed: Oct. 16, 1995

Related U.S. Application Data

[63] Continuation of Ser. No. 82,970, Jun. 29, 1993, abandoned.

[30] Foreign Application Priority Data

Jun. 30, 1992 [JP] Japan .................................. 4-173182

[51] Int. Cl.$^6$ ..................................................... H04Q 9/00
[52] U.S. Cl. ................................. 340/825.07; 340/825.52
[58] Field of Search ......................... 430/825.07, 825.52, 430/825.44, 825.47, 825.3, 825.31, 825.08; 370/92, 93, 10.1

[56] References Cited

U.S. PATENT DOCUMENTS

| | | | |
|---|---|---|---|
| 4,742,572 | 5/1988 | Yokoyama | 340/825.07 X |
| 4,839,640 | 6/1989 | Ozer et al. | 340/825.31 |
| 4,888,778 | 12/1989 | Brechard et al. | 371/37.4 |
| 4,947,162 | 8/1990 | Kimura | 340/825.07 X |
| 5,043,718 | 8/1991 | Shimura | 340/825.44 |

FOREIGN PATENT DOCUMENTS

| | | |
|---|---|---|
| 0315158A2 | 5/1989 | European Pat. Off. |
| 0282158A3 | 6/1989 | European Pat. Off. |
| 3-250830 | 11/1991 | Japan |

*Primary Examiner*—Edwin C. Holloway, III
*Attorney, Agent, or Firm*—Finnegan, Henderson, Farabow, Garrett & Dunner, L.L.P.

[57] ABSTRACT

A data transmission system includes control units connected to a network line and various sensors. Each of the control units includes an ID code comparing/processing section. In each of the ID code comparing/processing sections, multiplex communication control units, FIFO memory, CPU, main register and data extracting circuit are provided. Each of the multiplex communication control units receives an ID code extracted from a data frame transmitted via the network line by the data extracting circuit and checks whether the received ID code coincides with preset ID codes or not. The FIFO memory receives and holds the ID code in response to a coincidence signal from the multiplex communication control units and outputs a signal indicating that the ID code is held. The CPU detects that an ID code attached to main data necessary in the ID code comparing/processing section is input from the network line in response to a signal indicating that the ID code is held, processes main data stored in the main register corresponding to the ID code held in the FIFO memory.

14 Claims, 4 Drawing Sheets

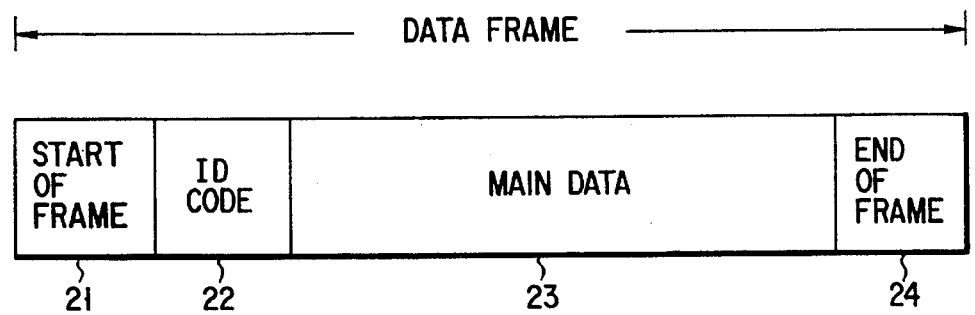
F I G. 3A
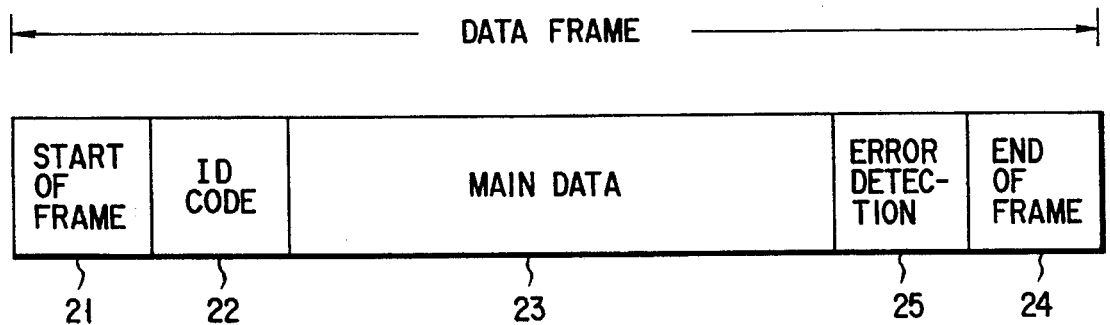
F I G. 3B

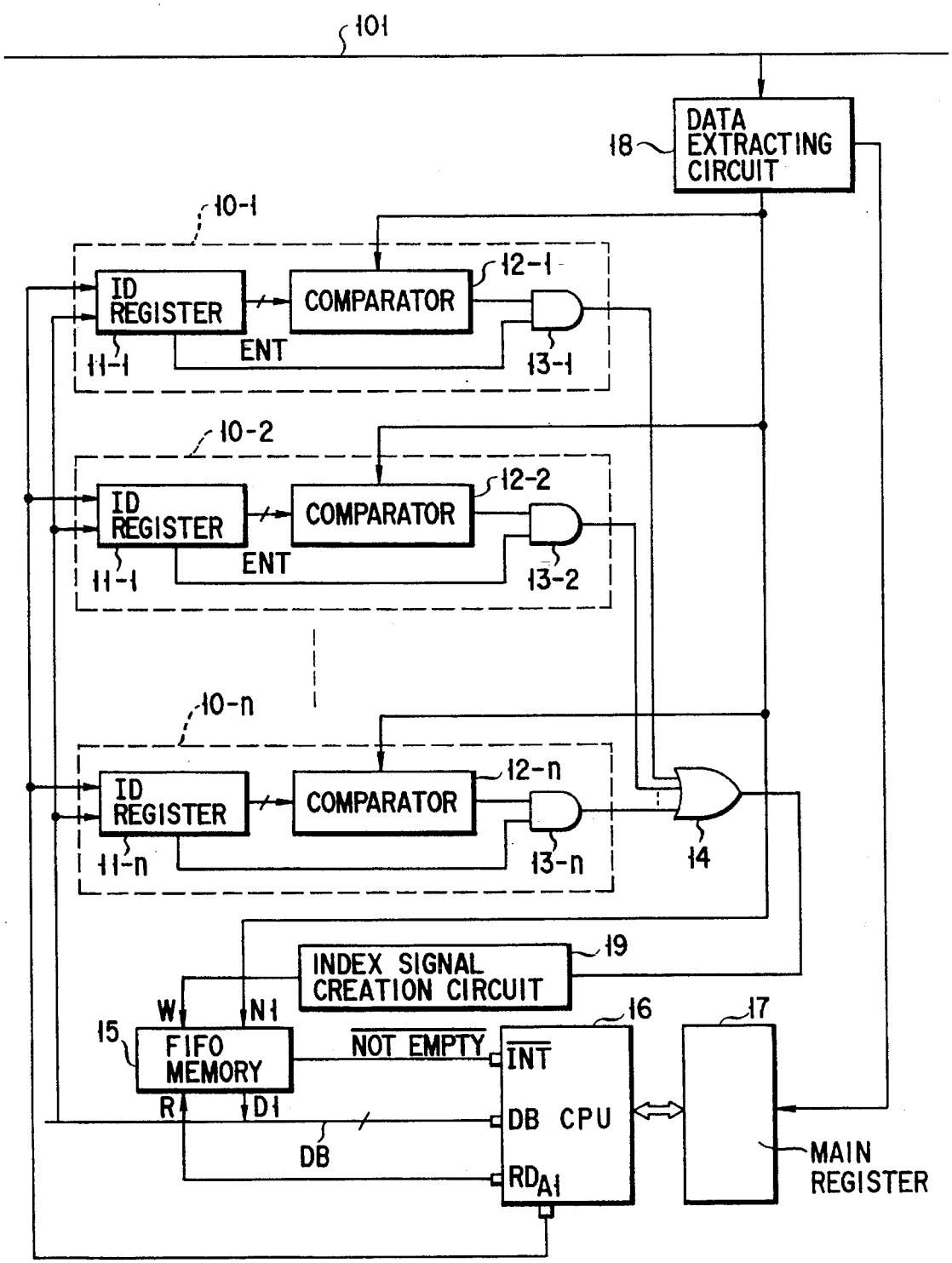
F I G. 4

DATA TRANSFER SYSTEM USING MEMORY WITH FIFO STRUCTURE

This application is a continuation, of application Ser. No. 08/082,970 filed Jun. 29, 1993, now abandoned.

BACKGROUND OF THE INVENTION

1. Field of the Invention

This invention relates to a data transfer system using a memory with FIFO (first-in first-out) structure, and more particularly to a multiplex communication system for use in a car, for example.

2. Description of the Related Art

In a multiplex communication system for use in a car, ID codes for identifying various data items such as the rotation speed of the engine, the speed of the car, the rotation speed of the wheel and the temperature of coolant are added to the respective data items and supplied to a network line, various control units for controlling the engine, brake and the like are connected to the network line. Each of the control units includes an ID code comparing/processing section. Each of the ID code comparing/processing sections includes multiplex communication control units of the same number as the ID codes and an OR gate for receiving coincidence signals output from the multiplex communication control units and informing a CPU of a fact that data necessary for the control unit. The multiplex communication control unit includes an ID register and a comparator for comparing ID codes previously stored in the ID register with an ID code received from the network line. Data corresponding to the coincident ID code is transferred to the CPU to control the engine, brake and the like to set them into optimum conditions. This type of multi-plex communication system for use in a car is disclosed as the prior art in Japanese Patent Disclosure No. 3-250830, for example.

However, with the system disclosed as the prior art in the above Japanese Patent Disclosure, it is required for the CPU to access the multiplex communication control units by as many times as the number of types of data items occurring in the worst case in order to determine which one of the plurality of ID codes is received from the network line by accessing each of the multiplex communication control units. Therefore, as the number of types of data items increases, it takes a longer time to identify the received ID code and transfer the received data to the CPU. This is particularly disadvantageous in a system for use on a car in which data transfer on the real time basis is required and the load of the CPU becomes heavy.

Further, since the time-series processing cannot be effected in the above conventional system, an ID code which has been received before may be lost when a plurality of ID codes are successively received from the network line, that is, when a succeeding ID code is received while the CPU accesses the multiplex communication control unit and identifies the ID code, and data processing for the lost ID code cannot be effected.

SUMMARY OF THE INVENTION

An object of this invention is to provide a data transmission system capable of effecting data processing on the real time basis and time-series data processing.

Another object of this invention is to provide a data transmission system capable of enhancing the operation speed of the ID code identification and data transmission to the CPU.

Still another object of this invention is to provide a data transmission system capable of alleviating the load of the CPU.

Another object of this invention is to provide a data transmission system capable of time-sequentially processing data while preventing loss of previously received ID codes even when a plurality of ID codes are successively received.

With the above construction, since the determination circuit (for example, CPU) determines whether or not an identification signal is supplied to the multiplex communication control circuits from the network line according to a signal indicating that an identification signal output from the data holding circuit is held or not, it is not necessary to access each of the multiplex communication control circuits. Therefore, the operation speed of identification of the identification signal (ID code) and data transmission to the CPU can be enhanced, the load of the CPU can be alleviated and the real time processing can be attained.

Further, since the data holding circuit of FIFO structure is used, ID codes are sequentially supplied to the data holding circuit when a plurality of ID codes are successively received and data items ranging from data corresponding to a previously input ID code to data corresponding to an ID code received later can be sequentially processed. Therefore, the previously received ID code is not lost and data can be time-sequentially processed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A and 3B are schematic diagrams showing examples of the structures of data frames; and FIG. 4 is a circuit diagram for illustrating a data transmission system according to a second embodiment of this invention.

DETAILED DESCRIPTION OF THE PREFERRED EMBODIMENTS

Figure 1:
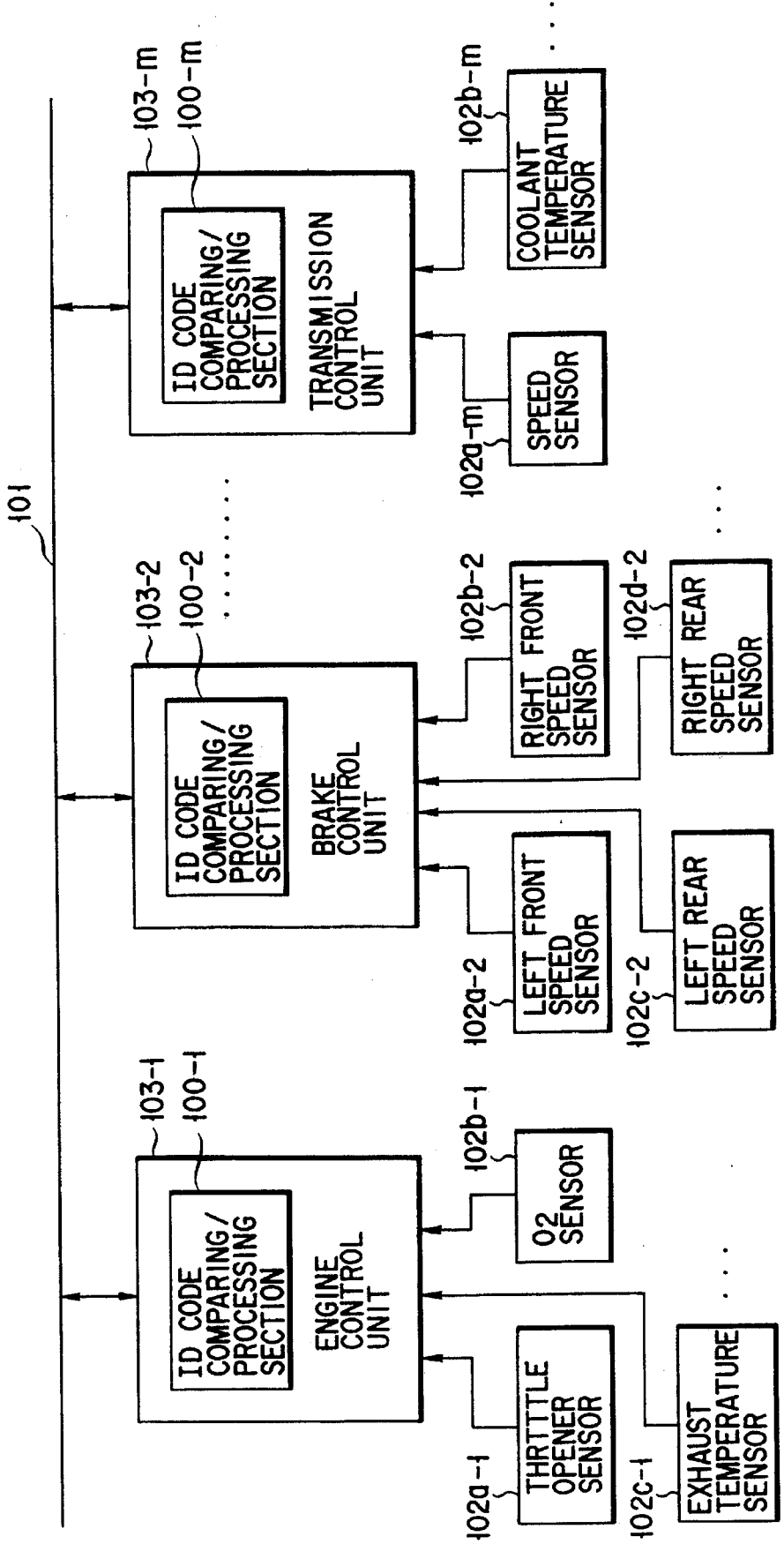
FIG. 1 is a block diagram showing the schematic construction of a multiplex communication system for use on a car, for illustrating a data transmission system according to a first embodiment of this invention.
Figure 2:
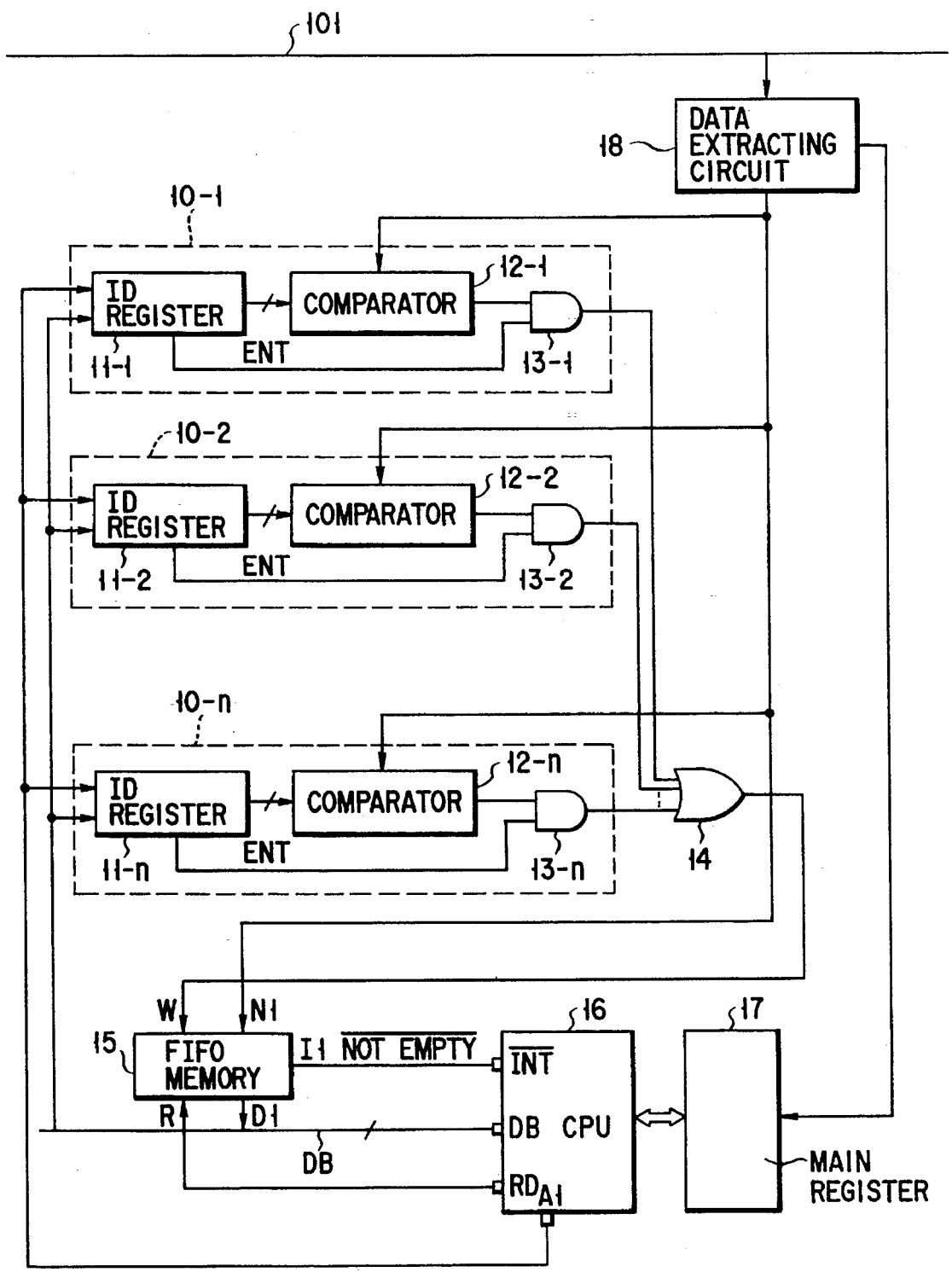
FIG. 2 is a circuit diagram showing an example of the construction of an ID code comparing/processing section shown in FIG. 1, for illustrating the data transmission system according to the first embodiment of this invention.

FIGS. 1 and 2 illustrate a data transmission system according to a first embodiment of this invention. FIG. 1 shows the schematic construction of a multiplex communication system for use on a car and FIG. 2 shows an example of the circuit construction of an ID code comparing/processing section shown in FIG. 1.

As shown in FIG. 1, a number of car control units 103-1 to 103-m, such as an engine control unit 103-1, brake control units 103-2, and a transmission control unit 103-m, are connected to a network line 101. Each of these car control units has an ID code comparing/processing section. To be specific, the engine control unit 103-1 has an ID code comparing/processing section 100-1, the brake control unit 103-2 has an ID code comparing/processing section 100-2, and the transmission control unit 103-m has an ID code comparing/processing section 100-m. Various types of sensors are connected to each of the car control units 103-1 to 103-m. For example, a throttle opening sensor 102a-1 for sensing the opening of a throttle valve, an $O_2$ sensor 102b-1 for measuring the amount of oxygen, and an exhaust temperature sensor 102c-1 for sensing the temperature of an exhaust gas, are connected to the engine control unit 103-1. A left-front speed sensor 102a-2 for sensing the rotation speed of the left-front wheel, a right-front speed sensor 102b-2 for sensing the rotation speed of the right-front wheel, a left-rear speed sensor 102c-2 for sensing the rotation speed of the left-rear wheel, and a right-rear speed sensor 102d-2 for sensing the rotation speed of the right-rear wheel, are connected to the brake control unit 103-2. A speed sensor 102a-m for sensing the car speed and a coolant temperature sensor 102b-m for sensing the temperature of a coolant are connected to the transmission control unit 103-m.

The engine control unit 103-1 regulates the amount of fuel supplied into the engine and controls the ignition timing on the basis of both the data obtained by sensors 102a-1 to 102c-1 (i.e., the data on the opening of the throttle valve, the amount of oxygen, and the temperature of the exhaust gas) and the main data included in a data frame transferred from control units 103-2 to 103-m by way of the network line 101. Furthermore, the engine control unit 103-1 attaches ID codes to the data obtained by sensors 102a-1 to 102c-1, and sends the data to the network line 101.

The brake control unit 103-2 controls the hydraulic pressure of the brake on the basis of both the data obtained by sensors 102a-2 to 102d-2 (i.e., the data on the rotation speeds of the four wheels) and the main data included in a data frame transferred from control units 103-1 and 103-3 to 103-m by way of the network line 101. Specifically, the brake control unit 103-2 decreases the hydraulic pressure of the brake when the locked state of the wheels is detected, and increases the hydraulic pressure of the brake when the rotated state of the wheels is detected. The hydraulic pressure of the brake is repeatedly increased or decreased in accordance with the state of the wheels. Furthermore, the brake control unit 103-2 attaches ID codes to the data obtained by sensors 102a-2 to 102d-2, and sends the data to the network line 101.

The transmission control unit 103-m selects an optimal gear in accordance with a load, on the basis of both the data obtained by sensors 102a-m and 102b-m (i.e., the data on the car speed and the temperature of the coolant) and the main data included in a data frame transferred from control units 103-1 to 103-(m−1) by way of the network line 101. Furthermore, the transmission control unit 103-m attaches ID codes to the data obtained by sensors 102a-m and 102d-m, and sends the data to the network line 101.

As shown in FIG. 2, each of the ID code comparing/processing sections 100-1 to 100-m includes a data extracting circuit 18 for extracting an ID code and main data from the data frame transferred via the network line 101, n multiplex communication control units 10-1 to 10-n corresponding in number to the ID codes, an n-input OR gate 14, a FIFO memory (buffer register of FIFO structure) 15, a CPU 16 and a main register 17. The multiplex communication control units 10-1 to 10-n respectively include ID registers 11-1 to 11-n, comparators 12-1 to 12-n and AND gates 13-1 to 13-n. As the CPU mentioned above, TMP8085A commercially available from Kabushiki Kaisha Toshiba can be employed. Where TMP8085A is employed as the CPU, an inverter circuit has to be provided between the interruption request output terminal I1 of the FIFO memory 15 and the interruption terminal $\overline{INT}$ of the CPU. Alternatively, the $\overline{NOT\ EMPTY}$ signal output from the FIFO memory 15 may be inverted in phase.

As shown in FIG. 3A, the data frame transferred via the network line 101 contains a code 21 indicating the start of the frame, an ID code 22, a main data 23, and a code 24 indicating the end of the frame. Further, as shown in FIG. 3B, data 25 for detection of error may be provided between the main data 23 and the code 24 indicating the end of the frame.

ID codes are attached to respective main data items derived from the sensors 102a to 102e to constitute data frames as shown in FIGS. 3A and 3B. The data frame is transferred via the network line 101 and supplied to the ID code comparing/processing sections 100-1 to 100-m. In the case where the ID code sent to the network line 101 coincides with one of the ID codes set in the ID registers 11-1 to 11-n, the CPU processes both the main data fetched in the main register 17 and the data obtained by the sensors connected to the control units, such that the engine control unit 103-1, the brake control unit 103-2, and the transmission control unit 103-m control the engine, the brake, and the transmission to be in respective optimal conditions.

Next, the operation of the ID code comparing/processing section 100-1 is explained in detail. The processing section 100-1 is used to control the engine control unit 103-1. A data frame transferred via the network line 101 is supplied to the data extracting circuit 18. An ID code 22 extracted by the data extracting circuit 18 is supplied to the comparators 12-1 to 12-n and the ID code input terminal N1 of the FIFO memory 15. Main data 23 extracted by the data extracting circuit 18 is supplied to the main register 17. The ID registers 11-1 to 11-n in the respective multiplex communication control units 10-1 to 10-n store ID codes corresponding to data items necessary for engine control, ID codes attached to data items of car speed derived from the speed sensor 102a-m, and ID codes attached to data items of the temperature of coolant derived from the coolant temperature sensor 102b-m, from the CPU 16 via a data bus DB. At this time, a write signal Al indicating that ID codes are written is supplied from the CPU 16 into each of the ID registers 11-1 to 11-n. As a result, signals ENT are output from those of the ID registers into which ID codes are written. The signal ENT is set to the "H" level when the ID code is written into the ID register and set to the "L" level when the ID code is not written into the ID register. Each of the comparators 12-1 to 12-n compares an ID code supplied from the data extracting circuit 18 with the ID codes written in the ID registers 11-1 to 11-n and generates an output of "H" level when the compared ID codes coincide with each other. For example, when an output of the comparator 12-1 of the multiplex communication control unit 10-1 is set to the "H" level, an output of the AND gate 13-1 is set to the "H" level since the signal ENT is set at the "H" level, and an output of the OR gate 14 is set to the "H" level. The output of the "H" level is supplied to the write terminal W of the FIFO memory 15 and an ID code supplied to the ID code input terminal N1 of the FIFO memory 15 from the data extracting circuit 18 is received and stored therein. When the ID code is received into the FIFO memory 15, a "NOT EMPTY" signal (which is an inverted signal of a "NOT EMPTY" signal) indicating the write-in state is output from the interruption request output terminal I1 to the interruption terminal INT of the CPU 16. The "NOT EMPTY" signal is set to the "L" level when an ID code is reside (not empty) in the FIFO memory 15 and set to the "H" level when an ID code is not reside (empty) in the FIFO memory 15. As a result, the CPU 16 detects that a data frame received from the network line 101 is necessary for engine control.

The main register 17 has n memory areas corresponding to the ID registers 11-1 to 11-n and main data supplied from the data extracting circuit 18 is held in a memory area corresponding to the ID code. The CPU 16 reads out main data from the memory area corresponding 10 to an ID code stored into the FIFO memory 15 and data output from the various sensors connected to the engine control unit 103-1 and processes the data, so as to control the injection amount of fuel supplied to the engine, ignition timing and the like in an optimum manner.

Likewise, the brake control unit 103-2 and transmission control unit 103-m are controlled by means of the ID code comparing/processing sections 100-2 and 100-m.

With the above construction, when data frames are successively input, ID codes extracted from the data frames are sequentially input to the FIFO memory 15 and main data is held in the main register 17. Therefore, previously input ID codes will not be lost even while the ID codes are processed in the multiplex communication control units 10-1 to 10-n, and after main data corresponding to the previously input ID code is processed, main data corresponding to a subsequently input ID code can be processed. Thus, since the above data transmission system has the FIFO memory 15, the time-series processing can be effected by the CPU 16 without losing a previously received ID code when ID codes are successively received from the network line 101.

Since the CPU 16 reads out an ID code held in the FIFO memory 15 in response to a "NOT EMPTY" signal output from the FIFO memory 15, it is not necessary for the CPU to access the multiplex communication control units, the ID code of the received main data can be immediately determined and main data can be transferred from the main register 17 to the CPU 16 at a high speed. Therefore, the CPU 16 can immediately process main data corresponding to an input ID code.

In the first embodiment described above, an ID code is extracted from the data frame transmitted via the network line and supplied to the FIFO memory 15, but it is also possible to provide an index signal creation circuit 19 between the data extracting circuit 18 and the ID code input terminal N1 of the FIFO memory 15 as shown in FIG. 4 and supply an index signal created in the circuit 19 by processing the ID code to the FIFO memory 15 instead of the ID code. For example, as the index signal, a low-order byte of an address in the memory area corresponding to each of the ID registers in the main register 17 can be used. In this case, the CPU 16 reads out an index signal from the FIFO memory 15, reads out main data from a memory area of the main register 17 which is specified by the index signal and processes the same.

Further, in the first embodiment, all of the multiplex communication control units 10-1 to 10-n are used, but it is also possible to selectively use part of the multiplex communication control units. In a case where part of the multiplex communication control units are selectively used, data "1" is written into a specified area of the ID register which selects an output signal of the output terminal A1 of the CPU 16 and data "0" is written into a specified area of the ID register which does not select the output signal. In this case, signals ENT output from the ID registers in the selected multiplex communication control units are set to the "H" level and signals ENT output from the ID registers in the non-selected multiplex communication control units are set to the "L" level. As a result, the AND gate in the selected multiplex communication control unit is enabled, a write signal is supplied to the write terminal W of the FIFO memory 15 via the OR gate 14 when coincidence of the ID code is detected by the comparator, and the ID code is stored into the FIFO register 15. On the other hand, since the AND gate of the non-selected multiplex communication control unit is disabled, an output of the comparator is blocked even if the ID codes coincide with each other and the ID code is not stored into the FIFO register 15.

Further, in the first and second embodiments, a multiplex communication system for use on a car is explained, but this invention is not limited to the system for use on a car and can be applied to another data transmission system.

What is claimed is:

1. A data transmission system comprising:
   a network line;
   a plurality of control units electronically connected to said network line, each of said plurality of control units including,
      multiplex communication control means for receiving identification signals extracted from data frames received from said network line and determining whether said extracted identification signals coincide with preset identification signals;
      a memory means for sequentially receiving and storing said extracted identification signals in response to coincidence outputs from said multiplex communication control means and for outputting signals indicating that said extracted identification signals are stored; and
      processing means for receiving said signals outputted from said memory means indicating that said identification signals are stored, for detecting that necessary data has been transmitted from said network line, and for processing said transmitted data, said processing means successively processing data corresponding to other identification signals stored in said memory means.

2. A data transmission system according to claim 1, wherein each of said plurality of multiplex communication control means includes ID storing means for storing an identification signal; comparing means for comparing an identification signal supplied from said network line with the identification signal stored in said ID storing means; and logic means for supplying a coincidence output of said comparing means to said memory means and causing said memory means to store the identification signal when the identification signal is stored in said ID storing means.

3. A data transmission system according to claim 2, wherein the identification signal stored in said ID storing means is supplied from said processing means.

4. A data transmission system according to claim 2, wherein said logic means includes an AND gate for deriving the logical AND of a signal indicating that the identification signal is stored in said ID storing means and an output of said comparing means; and an OR gate for deriving the logical OR of outputs of said AND gates.

5. A data transmission system according to claim 4, wherein said memory means stores the identification signal in response to an output of said OR gate.

6. A data transmission system according to claim 1, wherein said processing means fetches the identification signal held in said memory means in response to a signal indicating that an identification signal output from said memory means is held.

7. A data transmission system according to claim 1, wherein said processing means includes a CPU.

8. A data transmission system according to claim 6, which further comprises main storing means for storing main data extracted from a data frame received from said network line and in which said processing means processes main data stored in said main storing means and corresponding to the fetched identification signal.

9. A data transmission system according to claim 8, wherein said main storing means includes storing areas of the same number as said multiplex communication control means.

10. A data transmission system comprising:

a network line;

a plurality of control units electrically connected to said network line, each of said plurality of control units including,
   data extracting means for extracting ID codes and main data from data frames transmitted via said network line,
   ID storing means for storing preset ID codes;
   comparing means for comparing ID codes extracted by said data extracting means with ID codes stored in said ID storing means;
   a memory means for sequentially receiving and storing the ID codes extracted by said data extracting means in response to coincidence signals outputted from said comparing means and for outputting signals indicating that said ID codes are stored in said memory means;
   main storing means for storing main data extracted by said data extracting means; and
   a CPU for supplying ID codes to said ID storing means, for outputting signals indicating that ID codes are stored, for receiving signals indicating that ID codes output from said memory means are stored, and for processing main data stored in said main storing means corresponding to the ID codes stored in said memory means, said CPU successively processing data stored in said main storing means corresponding to other ID codes stored in said memory means.

11. A data transmission system according to claim 10, further comprising logic means for supplying a coincidence signal output from said comparing means to said memory means in response to a signal output from said ID storing means and indicating that the ID code is stored and the coincidence signal output from said comparing means when an ID code is stored in said ID storing means and causing the ID code extracted by said data extracting means to be stored into said memory means.

12. A data transmission system according to claim 11, wherein said logic means includes an AND gate for deriving the logical AND of a signal indicating that the ID code is stored in said ID storing means and an output of said comparing means; and an OR gate for deriving the logical OR of outputs of said AND gates.

13. A data transmission system according to claim 12, wherein said memory means holds the ID code in response to an output of said OR gate.

14. A data transmission system according to claim 10, wherein said main storing means has a plurality of storing areas corresponding in number to the ID codes.

\* \* \* \* \*